United States Patent [19]
McGinty et al.

[11] Patent Number: 6,163,603
[45] Date of Patent: Dec. 19, 2000

[54] COIN ESCROW APPARATUS WITH RELAY SWITCH CONTACT SIMULATOR

[75] Inventors: Joseph R. McGinty, Madison; Steven Michael Faes, Huntsville; Paul M. Evans, Union Grove, all of Ala.

[73] Assignee: QVEX, Inc., Madison, Ala.

[21] Appl. No.: 09/185,993

[22] Filed: Nov. 4, 1998

Related U.S. Application Data

[60] Provisional application No. 60/064,523, Nov. 5, 1997.

[51] Int. Cl.[7] .................................................. H04M 17/00
[52] U.S. Cl. .......................... 379/143; 379/145; 379/146; 379/150; 379/155; 194/346
[58] Field of Search ..................................... 379/143–155; 194/346

[56] References Cited

U.S. PATENT DOCUMENTS

| | | |
|---|---|---|
| 4,192,972 | 3/1980 | Bertoglio et al. . |
| 5,216,707 | 6/1993 | Davenport et al. . |
| 5,924,543 | 7/1999 | Faes et al. ............................... 379/150 |

*Primary Examiner*—Duc Nguyen
*Attorney, Agent, or Firm*—Gardner & Groff, P.C.

[57] ABSTRACT

A coin escrow apparatus for use with a pay telephone includes a housing defining a coin hopper, a coin acceptance chute, and a coin return chute. The apparatus also includes a door mounted within the housing for selective movement between an escrow position for supporting coins in the hopper, an acceptance position for releasing coins from the hopper to the coin acceptance chute, and a return position for releasing coins from the hopper to the coin return chute. The apparatus also includes structures for selectively moving the door between its escrow, acceptance, and return positions. An integrated circuit is provided for unconditionally simulating a relay switch contact normally indicative of successful firing of the escrow coin apparatus to allow the coin escrow apparatus to be used with so-called "smart" telephones without requiring electromechanical components to sense and indicate successful firing of the coin escrow apparatus.

11 Claims, 11 Drawing Sheets

FIG. 14B     FIG. 14A ns for local conditions. This# COIN ESCROW APPARATUS WITH RELAY SWITCH CONTACT SIMULATOR

CROSS-REFERENCE TO RELATED APPLICATION

The present application claims the benefit of provisional patent application Ser. No. 60/064,523, filed on Nov. 5, 1997.

TECHNICAL FIELD

The present invention relates generally to pay telephones and in particular relates to a coin escrow apparatus therefor.

BACKGROUND OF THE INVENTION

In the operation of pay telephones, it is important to be able to temporarily accept a coin pending the connection of the attempted telephone call. For example, if the telephone call is not completed, the coins are to be refunded. On the other hand, if the call does go through and is answered on the other end, the coins are accepted and passed to the coin receptacle or coin box.

An early example of a coin escrow mechanism is shown in U.S. Pat. No. 751,081 of Larned (patented in 1904). The '081 patent describes a coin-controlled telephone apparatus in which coins are deposited and either initially rejected along a coin return path or selectively captured temporarily subject to permanent collection upon the connection of the telephone call. The '081 patent describes that the control of the apparatus to accept or reject coins is effected by a remote telephone operator at a central switchboard.

U.S. Pat. No. 886,499 of J. Harrison discloses a pay telephone box with a coin acceptance mechanism using a V-shaped gate pivotally mounted in the coin chute at a point where the chute branches into a depositing chute and a return chute. As in the Larned patent, the '499 patent describes control by a remote operator who activates an actuator in the mechanism which deposits the coin into either of the desired chutes.

U.S. Pat. No. 1,098,673 of Lyng discloses a coin collector or coin escrow mechanism which uses a pivotal coin escrow door positioned beneath a coin hopper. The coin escrow door is supported by a pendulum arm which is pivoted from a position above the door. The pendulum arm has a roller at the bottom thereof for engaging a curved cam beneath the lower door and as the arm swings the roller in one direction, the lower door is allowed to tilt downwardly in an opposite direction. However, because the pendulum arm moves upwardly somewhat as it swings sideways, it tends to continue to hold the escrow door tightly closed until a substantial angular movement of the pendulum arm has been effected. Indeed, the curved cam of Lyng appears to have a radius of curvature closely matching the curvature of the pivotal motion of the roller about the pivot point of the pendulum arm, thereby maintaining a consistent upward force on the lower door until the pendulum arm is rotated enough to move the roller from between the pivot points about which the lower door is supposed to rotate. This requires that the pendulum arm be moved a substantial amount in order to release the coins from the hopper into one chute or the other. In fact, to ensure that the lower door eventually opens, a reverse bend is formed in the cam beyond the pivot points to force the door open once the roller has cleared the pivot points. Requiring such an exaggerated motion tends to require substantial power to actuate the mechanism.

U.S. Pat. No. 5,216,707 discloses a coin escrow unit which operates on the principles of a relay. The relay is designed to trip one way or another based on receiving a signal of positive 130 volts DC or negative 130 volts DC and based on there being a certain amount of current flowing. Thus, in order to trip the relay one way or the other, both a current criteria and a voltage criteria are to be met. In order to ensure that the relay trips one way or the other only when desired (and not when a simple coin test is being conducted to see if a coin has been received or not) mechanical adjustments of springs and tension on the springs must be made in the field to compensate for local conditions. This makes the manufacturing of a uniformly performing product extremely problematical and requires careful installation and frequent maintenance of the relay in order to ensure proper operation.

The coin escrow units just described generally have been designed to be used in conjunction with a coin operated pay telephone which is controlled by a central office. In this arrangement, the central office makes certain determinations to evaluation whether to accept or reject coins contained in the escrow unit or to return them to the user. More recently, it has become popular for a pay telephone to be customer-owned and coin-operated, the so-called customer-owned, coin-operated telephone (COCOT). In these arrangements, the control is effected locally, rather than through a central office. These types of phones are often called "smart phones" because the decision-making power is placed within the phone or nearby. Conventionally, operators of these types of phones have demanded a very high level of performance. In this regard, operators have found it necessary to ensure that the coin escrow unit is instructed properly to accept the coinage, to return the coinage, or to simply continue to hold on to the coinage. Operators of such telephones also require that the coin escrow unit provide physical confirmation that the coinage has been successfully returned or accepted. To accomplish this, prior art escrow designs designed for use with a "smart" telephone chassis have incorporated various flags, switches, relays, etc., to convert mechanical movement of part of the coin escrow unit into a signal which represents that the coin escrow unit has successfully accepted, or successfully returned, the coinage contained within the coin escrow unit. Unfortunately, this requirement that the system actually confirm that the coin escrow unit has properly fired has led to a complicated and costly mechanism for confirming the successful firing of the coin escrow unit.

Recently, Quadrum Telecommunications, Inc. of Huntsville, Ala. (assignee of the present application) has developed an improved coin escrow unit. The new improved coin escrow unit is described in co-pending U.S. patent application Ser. No. 08/903,448 (filed on Jul. 3, 1997) and has exhibited very high reliability and dependability rates, obviating the need for continual testing to see whether the coin escrow unit has successfully fired or not.

Unfortunately, such a coin escrow unit to be used with existing "smart" telephones, a problem exists in that the smart telephones seek a confirmation that the coin escrow mechanism has successfully fired. Although it would be possible to add the necessary eletromechanical components to test for and then generate an electrical signal indicative of successful firing of the coin escrow apparatus, this would inherently raise the level of complexity of the improved coin escrow apparatus and at the same time would raise the cost as well.

Accordingly, it can be seen that a need yet remains for a coin escrow apparatus having substantially improved reliability over prior art devices and which is compatable with the more recent "smart" telephones. It is to the provision of such a coin escrow apparatus that the present invention is primarily directed.

SUMMARY OF THE INVENTION

Briefly described, in a preferred form the present invention comprises a coin escrow apparatus for use with a pay telephone. The coin escrow apparatus includes a housing defining a coin hopper, a coin acceptance chute, and a coin return chute. The coin escrow apparatus also includes a lower door mounted within the housing for selective movement between an escrow position for supporting coins in the hopper, an acceptance position for releasing coins from the hopper to the coin acceptance chute, and a return position for releasing coins from the hopper to the coin return chute. The escrow apparatus also includes actuator means for selectively moving the lower door between the escrow, acceptance, and return positions. The coin escrow apparatus also includes electronic means which are responsive to a control signal for delivering electrical power to the actuator means for controlling selective movement of the moving door. The electronic means unconditionally produces an actuator firing confirmation signal which is responsive to the control signal, regardless of whether the actuator means actually fires successfully or not.

Preferably, the electronic means comprises an integrated circuit. Also preferably, a first part of the integrated circuit is opto-isolated from a second part of the integrated circuit. Preferably, the electronic means is adapted to delay slightly the generation of the actuator firing confirmation signal and to maintain the actuator firing confirmation signal a selected length of time to mimic a generated signal of a mechanical relay. Preferably, a capacitor is used to extend the duration of the actuator firing confirmation signal.

Preferably, the means for selectively moving the lower door also includes pivotal support means positioned below the door and having an upper portion engaging the underside of the door intermediate the first and second ends of the door. Further, actuator means are provided for pivoting the pivotal support means.

Preferably, the pivotal support means is perpendicular to the door when the door is in its escrow position. Also preferably, the guide means comprise curved pivot tracks and curved guide tracks, with the pivot tracks being shorter and more sharply curved than the guide tracks.

Also preferably, the coin escrow apparatus includes magnetic centering means for centering the pivotal support means beneath the door in the escrow position. Furthermore, the escrow apparatus preferably includes fulcrums formed in the housing and shoulders formed on the door, wherein the shoulders in the door cooperate with the fulcrums in the housing to facilitate the pivotal movement of the door about the fulcrums.

Also preferably, the coin hopper has sidewalls which are constructed of a sufficient thickness to overhang or slightly shroud at least some of the edges of the pivotal door to help prevent coins from becoming lodged between the door and the housing. In this way, the coin escrow apparatus resists accidental jamming.

Preferably, the coin hopper is constructed to hold a large volume of coins and to accept and pass large coins up to at least about 35 mm. in diameter.

Also, the coin acceptance chute and the coin return chute preferably are removably mounted whereby to make a coin escrow apparatus for a given type of phone, one style of coin return chute and coin acceptance chute are employed. For another type of phone, another style of chutes is used.

The unconditional generation of this actuator firing confirmation signal allows the coin escrow apparatus to be used with so-called "smart" telephones. This is so because the smart telephones expect to receive such a signal from a coin escrow apparatus indicating that the coin escrow apparatus has successfully fired. In the absence of receiving such a signal after directing the coin escrow apparatus to fire, an error message is generated, which can lead to annoying false alarms. This unconditional generation of the confirmation signal without testing for actual firing is made possible and more practical because the reliability of the firing of the improved coin escrow apparatus is extremely high in comparison to the prior art arrangements. Because of this extreme reliability, the need for electromechanically sensing and confirming that the coin escrow apparatus has successfully fired is eliminated. By making the escrow apparatus extremely reliable and dependable and eliminating the electromechanical indicators, a coin escrow apparatus is provided which is both rugged and economical.

The coin escrow apparatus according to the present invention has numerous other advantages. Firstly, it is mechanically simple and rugged, and has excellent reliability. Furthermore, the coin escrow apparatus requires very little power to be actuated and to dispense the coins into one or the other of the coin chutes. In fact, as the pivotal support member begins to move in one direction or the other away from the centered (escrow) position, the weight of the coins in the coin hopper tends to help push the door open, thereby allowing the apparatus to be operated at low power levels. Despite the ability to be operated at low power levels, the coin escrow apparatus also is very resistant to self-actuation in that in the escrow position the door is supported above a vertical pivotal support member, making it virtually impossible for the weight of the coins contained in the hopper to open the door. In this regard, the centering means which is used to help make sure that the pivotal support member is centered under the door when in the escrow position, greatly helps in avoiding self-actuation. Moreover, because of the shrouded edges of the door, great resistance to jamming is achieved. Also, due to the curved guide tracks and the use of guide pins, the door is smoothly and reliably guided between its various positions.

Accordingly, it is a primary object of the present invention to provide a coin escrow apparatus which is compatable with so-called "smart" pay telephones, but without requiring electromechanical components to sense and indicate the successful firing of the coin escrow apparatus.

It is another object of the present invention to provide a coin escrow apparatus which is mechanically simple, rugged, reliable, and durable in operation.

It is another object of the present invention to provide a coin escrow apparatus which resists self-actuation.

It is another object of the present invention to provide a coin escrow apparatus which requires low power for actuation.

It is another object of the present invention to provide a coin escrow apparatus which resists jamming.

It is another object of the present invention to provide a coin escrow apparatus which requires low power for operation, yet which also resists self-actuation.

It is another object of the present invention to provide a coin escrow apparatus which is simple in its construction, reliable in use, and economical to manufacture.

These and other objects, features, and advantages of the present invention will become more apparent upon reading the following description in conjunction with the accompanying drawing figures.

DETAILED DESCRIPTION OF THE PREFERRED EMBODIMENTS

Figure 1:
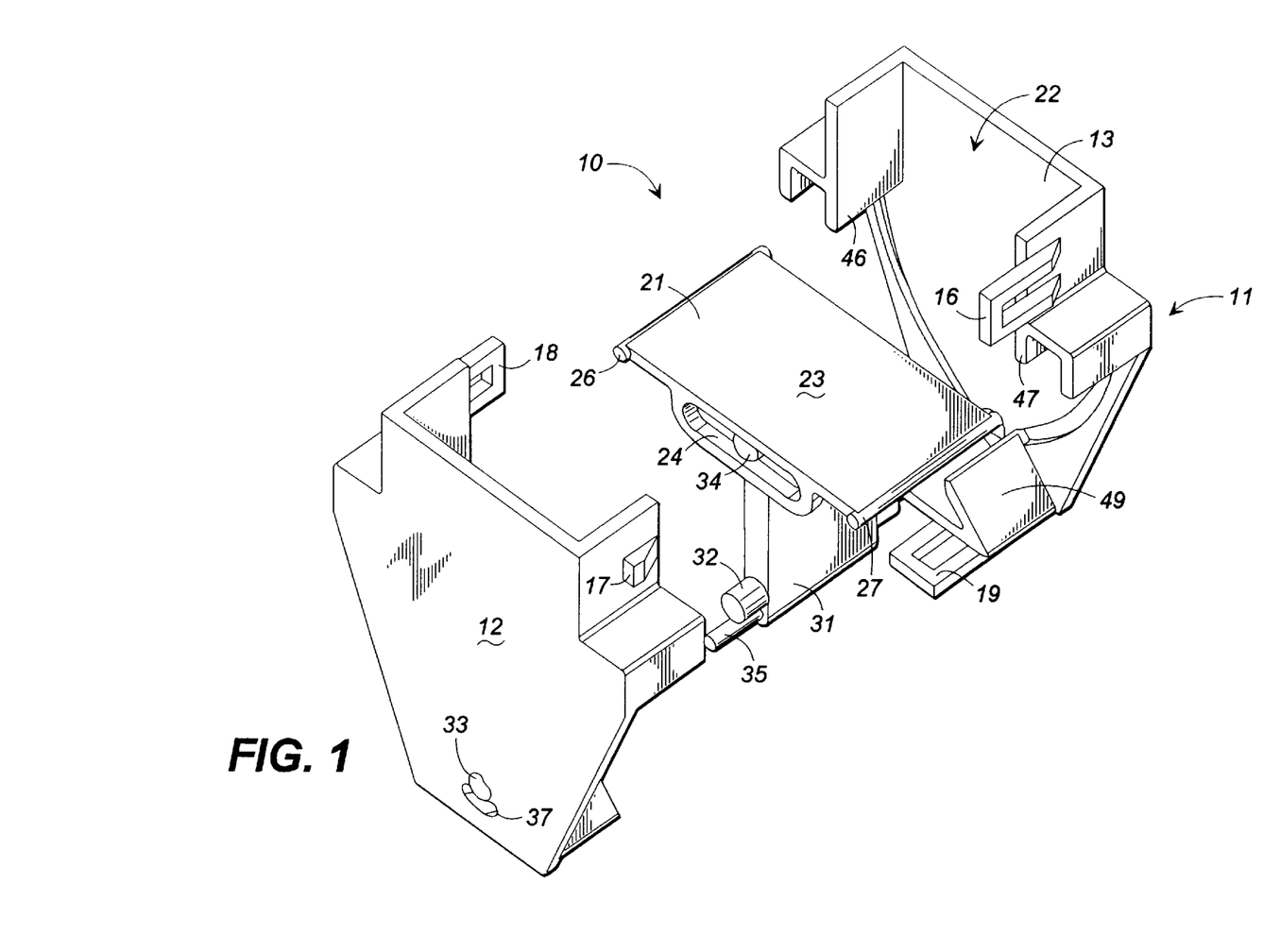
FIG. 1 is a perspective, partially exploded view of a coin escrow apparatus according to a preferred form of the invention.
Figure 2:
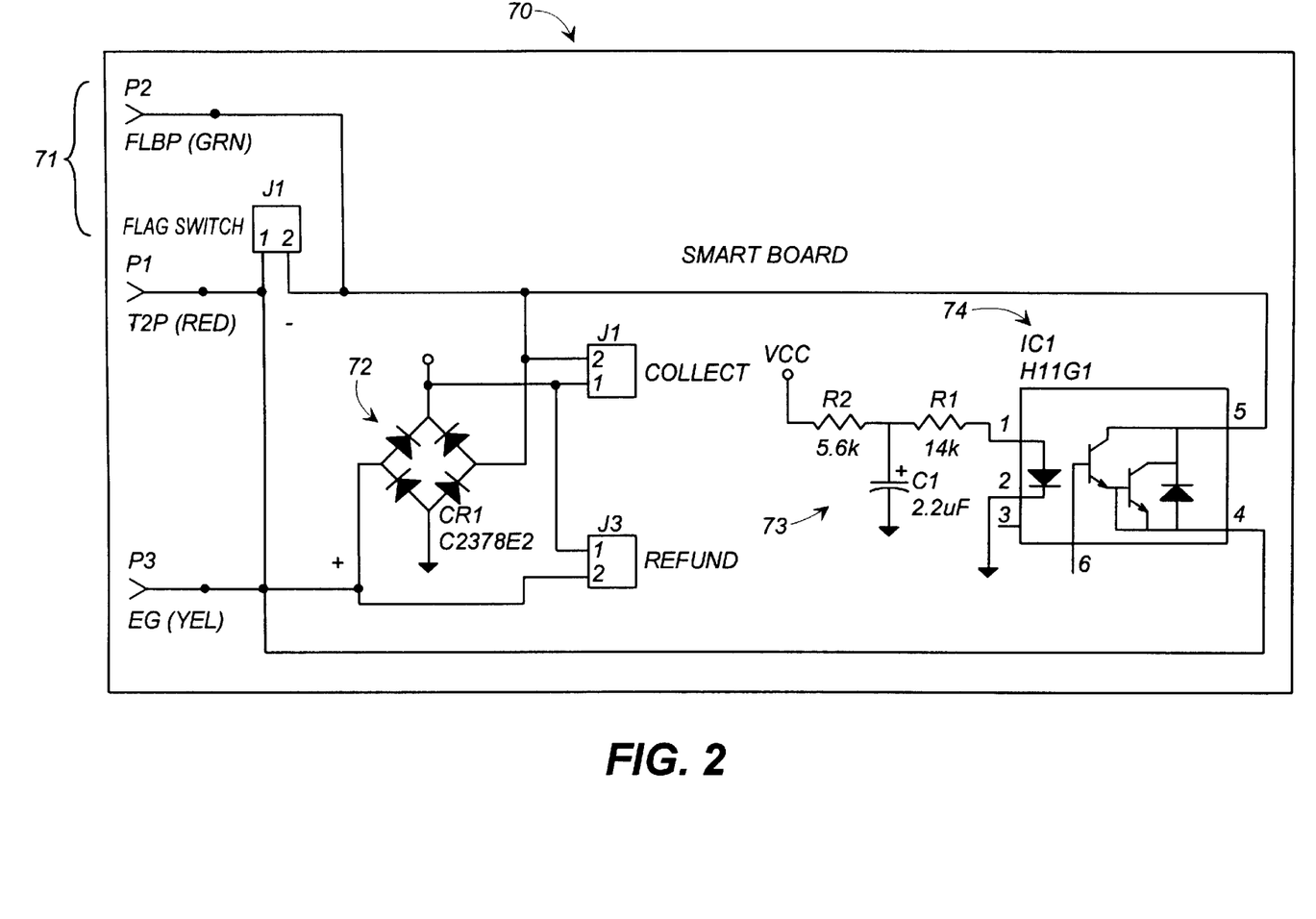
FIG. 2 is a schematic electrical diagram of an integrated circuit for use with the coin escrow apparatus of FIG. 1 or FIG. 7.
Figure 3A:
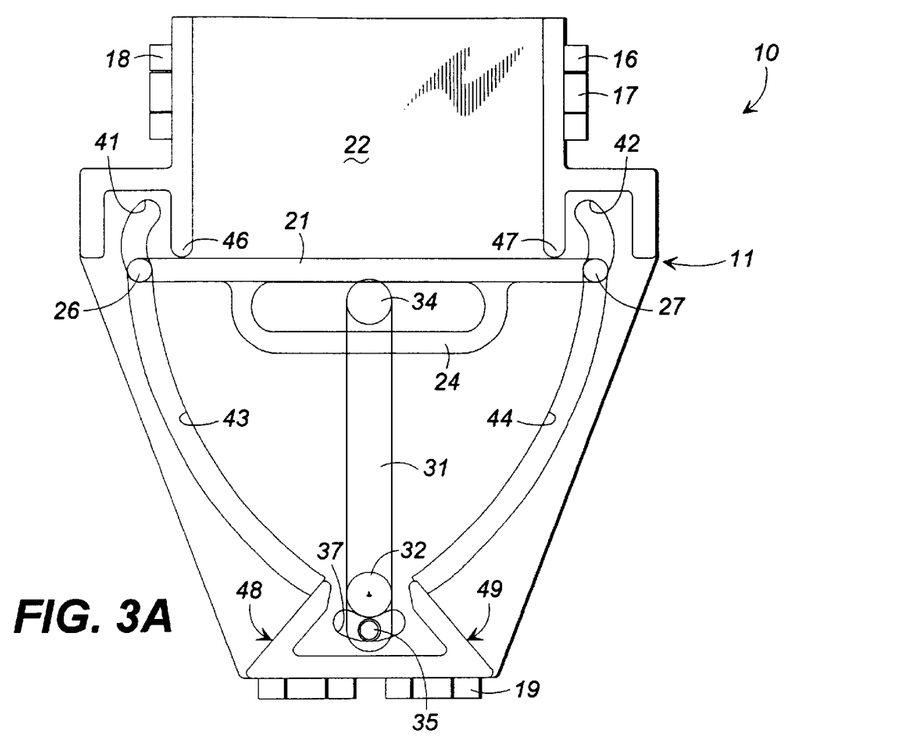
FIG. 3A is a schematic, functional illustration of the coin escrow apparatus of FIG. 1.
Figure 7:
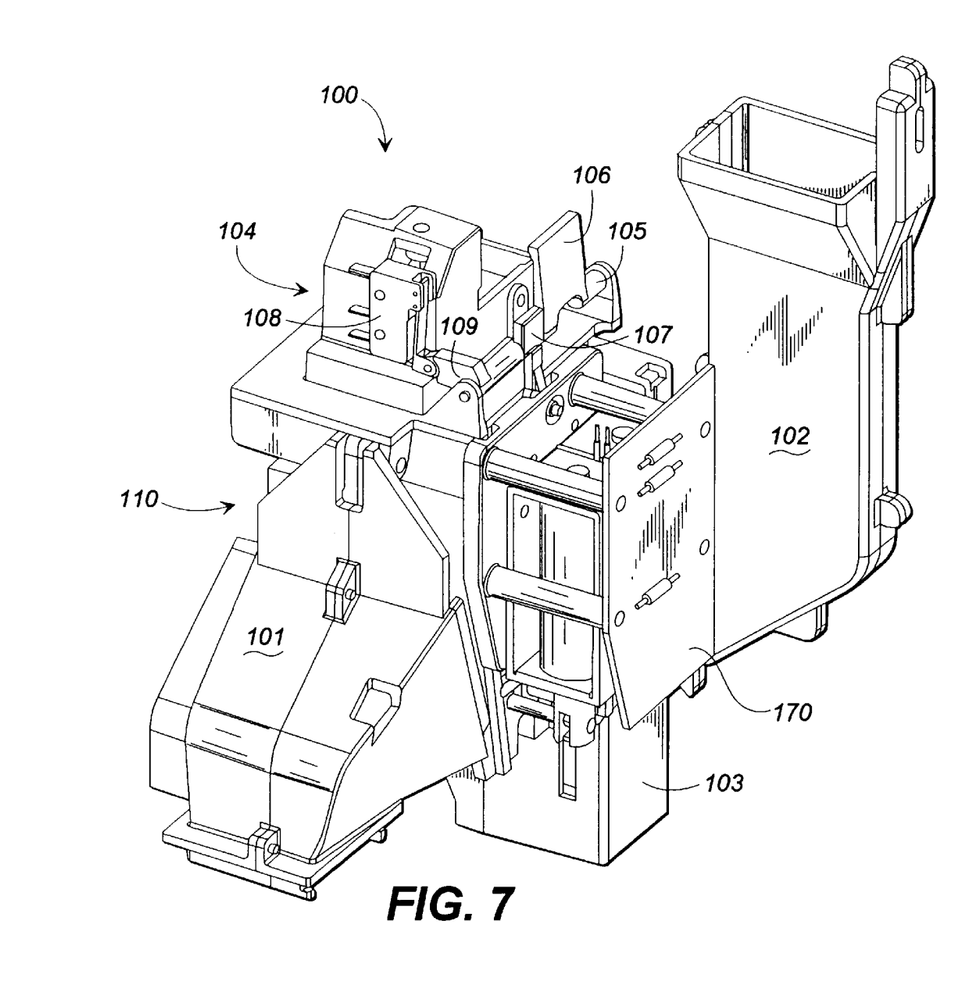
FIG. 7 is a perspective illustration of a coin escrow apparatus according to another preferred form of the invention, shown with coin acceptance and coin rejection adapters mounted thereto.

Referring now to the drawing figures, wherein like reference numerals represent like parts throughout the several views, FIGS. 1 and 7 show mechanical aspects of escrow apparatus according to the invention, while FIG. 2 shows an integrated circuit for use therewith according to a preferred form of the invention. Referring now in detail to FIGS. 1 and 3A, the escrow apparatus 10 includes a housing 11, which housing is made up of housing half-portions 12 and 13. The housing half-portions 12 and 13 are each made of molded plastic and are configured to snap together. To hold the housing halves together, snaps 16–19 and some additional unshown snaps are provided.

The housing includes a lower door 21 positioned within the housing and which defines an upper coin hopper 22. The door is movable between an escrow position (shown in FIG. 3A), a coin acceptance position, and a coin return position. The door 21 includes a flat upper surface 23 and a cam track 24 at the underside thereof. The lower door also includes elongate guide pins 26 and 27 at the outer ends thereof.

A pivotal support member 31 is pivotally mounted to the housing 11 about a pivot axle 32 which rides in a pivot bore 33. At an upper end of the pivotal support member 31 a cam portion 34 is formed and rides within the cam track 24 to translate pivotal motion of the pivotal support member 31 into pivotal motion of the lower door 21. The pivotal support member 31 also includes a crank pin 35 for engagement with an actuator (not shown in FIG. 1 or FIG. 3A). The crank pin 35 rides within an arcuate track 37 whose radius of curvature is matched to the distance of the crank pin 35 from the center of the pivot axle 32.

The guide pins 26 and 27 at the ends of the lower door 21 ride in pivot tracks 41 and 42 and guide tracks 43 and 44. As can be seen from FIG. 3A, the pivot tracks 41 and 42 are much shorter and have a tighter curvature than the guide tracks 43 and 44. The effect of this difference is that as the pivotal support member 31 is moved in one direction or the other, one end or the other of the door 21 moves within its associated pivot track and is ultimately limited thereby, while the other end of the door swings about the first end within the longer, less curved guide track.

The housing half-portion 13 of the housing 11 also includes fixed pivot points 46 and 47 which also act as positive stops to limit upper movement of the door 21 as it is brought to its escrow position of FIG. 3A. As the door is pivoted one way or another by movement of the pivotal support member 31, the door 21 is pivoted about one or the other of these fixed pivot points and also slides thereby somewhat.

The housing 11 also includes coin chute surfaces, such as surfaces 48 and 49 which help define a coin acceptance chute and coin return chute.

Figure 3B:
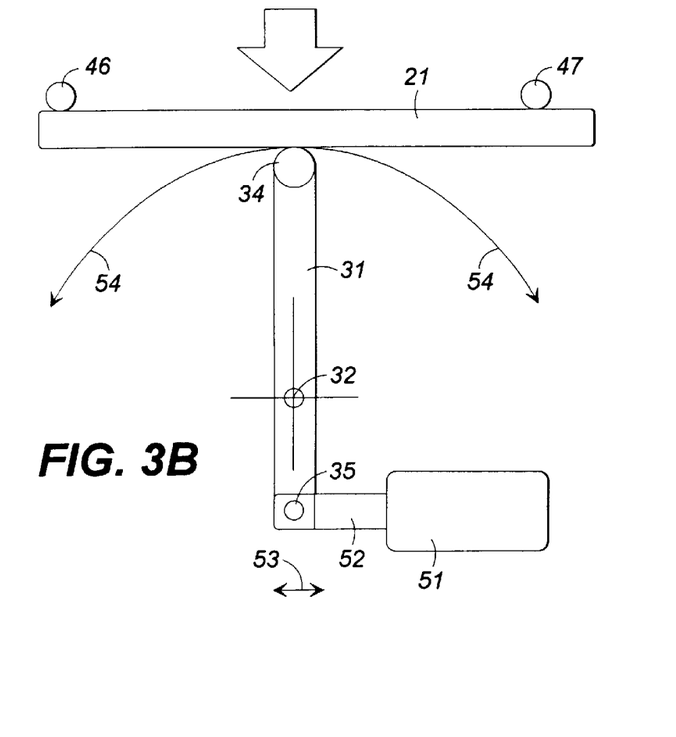
FIG. 3B is a schematic, functional illustration of the coin escrow apparatus of FIG. 1.

Referring to now FIG. 3B, one can see that the door, indicated schematically at 21, can be operated to move between its escrow position (shown) and its coin acceptance and coin return positions by selective operation of a push-pull solenoid 51. The solenoid 51 is connected to the crank pin 35 by means of an actuator arm or solenoid arm 52. As can be appreciated from this figure, in or out movement of the arm 52 by operation of the solenoid in the direction of direction arrow 53 causes the pivotal support member 31 to pivot and swing the cam 34 along direction 54.

FIG. 2 shows a schematic diagram of a printed circuit board, which is an integrated circuit that simulates a set of relay contacts normally found in a conventional coin escrow apparatus used with a so-called "smart" telephone. The integrated circuit also directs current through the proper solenoid for collection or refunding money. The printed circuit board 70 includes a first circuit 71 for applying a collect signal or a refund signal. The collect/refund signal can be applied through terminal P1 through the coin flag switch 12 to terminal P3. Alternately, the coin flag switch 13 can be by-passed by applying the signal from terminal P2 to terminal P3. The collect/refund signal then goes to a bridge rectifier 72 that is used to change the positive or negative voltage into a single positive voltage at the output thereof and also to direct current through the proper collect or refund solenoids.

The integrated circuit 70 also includes a second circuit 73 which is operational to charge a capacitor C1 during the collect or refund signals and to energize a third circuit 74. The energy stored in the capacitor C1 is then used to extend the "on time" of the third circuit 74.

Circuit 74 is an opto-isolated arrangement used to simulate the second set of relay contacts in a conventional coin escrow apparatus during the execution of the collect/refund operations. The opto-isolated device output is outputted across the relay flag contacts P1 and P2. The on time of the device is extended by having the capacitor C1 discharge through a lightemitting diode (LED) of the opto-isolated device, thereby allowing the "smart" pay telephone to think that the second set of relay contacts has operated indicating that the coin escrow unit has successfully fired.

Figure 4:
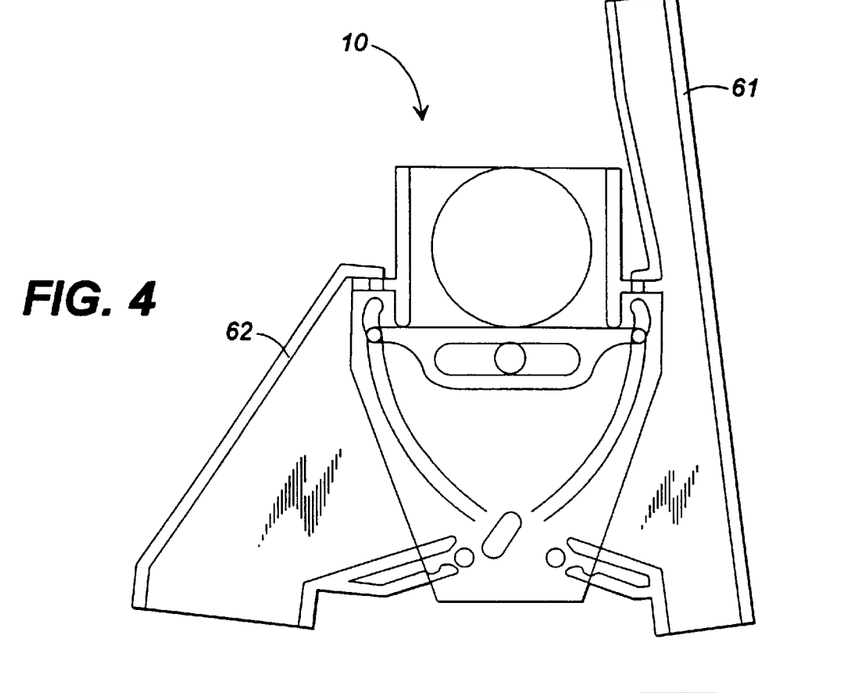
FIG. 4 is a schematic illustration of the coin escrow apparatus of FIG. 1, shown being attached to a separate coin acceptance chute and coin return chute.

FIG. 4 shows the escrow apparatus of FIG. 1 being attached to a coin return adapter 61 and a coin acceptance adapter 62. These adapters snap on or clip on in place.

Figure 5:
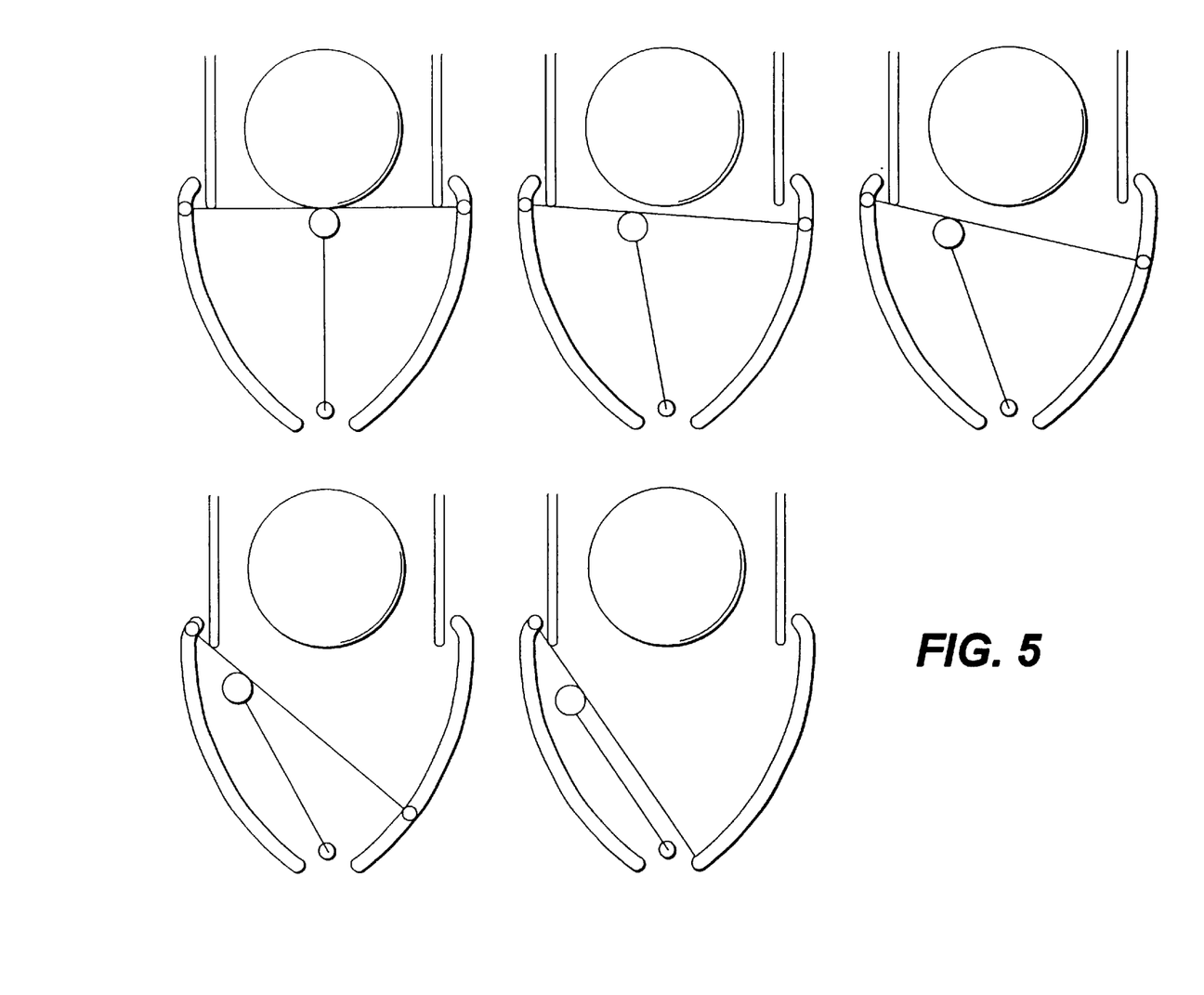
FIG. 5 shows, progressively, the movement of the lower door portion of the coin escrow apparatus of FIG. 1 from an escrow position to a return position.

FIG. 5 shows, in progressive fashion, the movement of the door from an escrow position to a coin return position. In this regard, one can see that the guide pins attached to the ends of the door move in quite different paths, with one guide pin moving only within the small pivot track associated therewith, while the opposite guide pin of the door swings through the longer guide track opposite thereof. To return the door from the coin return position to the escrow position, the movement is simply reversed. Furthermore, one can quickly appreciate that to move the door from its escrow position to the coin acceptance position, the required movements are mirror images of those shown in FIG. 5.

This construction has numerous advantages. For example, the inboard pivot points allow the door to be easily returned to its home position (the escrow position). Also, the weight of the coins atop the door assists the door in moving to a coin return or coin acceptance position, rather than retarding such movement as is typical in the prior art. Also, this apparatus has very few moving parts, increasing the reliability and ruggedness thereof. Furthermore, because the pivotal support arm 31 is vertical and perpendicular to the door 21 in the escrow position, to move the door to one of the other positions, the pivotal support arm does not have to lift the door (and the coins).

Figure 6:
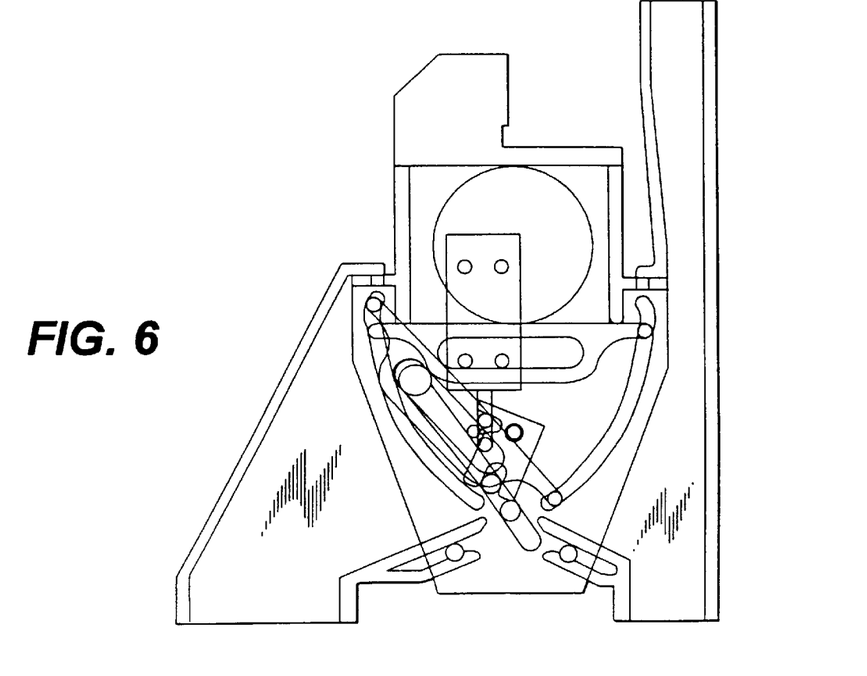
FIG. 6 is a schematic illustration of a coin escrow apparatus according to a second preferred form of the invention.

FIG. 6 shows a modified form of the present invention in which instead of using a horizontally mounted solenoid, a vertically mounted solenoid is provided. Furthermore, FIG. 6 shows the use of a bell crank as a way to multiply the movement of the solenoid arm to achieve greater movement of the pivotal support member for a given amount of movement of the solenoid arm.

Figure 8:
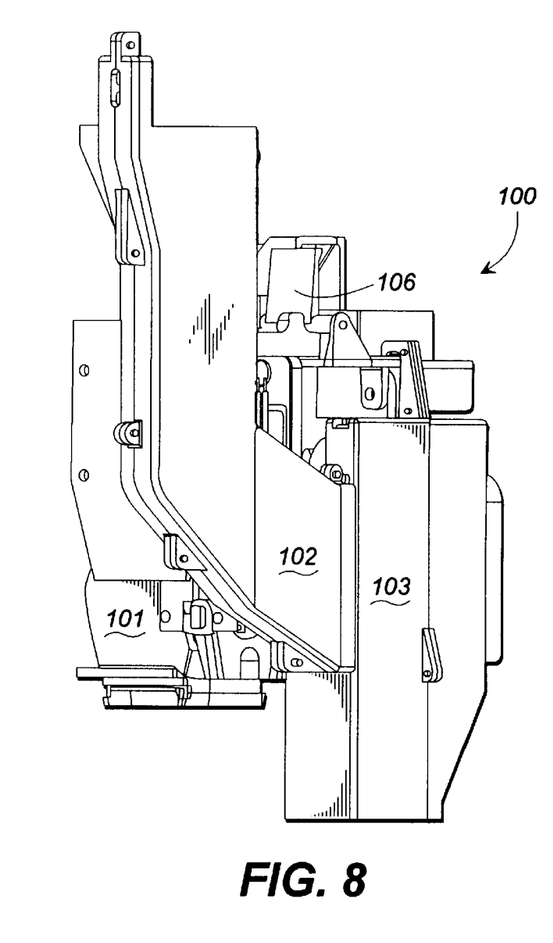
FIG. 8 is a side view of the coin escrow apparatus of FIG. 7.

FIGS. 7 and 8 show another version of the coin escrow apparatus according to another preferred form of the invention. The coin escrow apparatus 110 is shown as part of a larger assembly 100. The assembly 100 includes a collector adapter 101 for delivering coins from the coin escrow apparatus 110 to a collection box (unshown). The assembly 100 also includes a coin reject adapter 102 which is attached to and cooperates with a refund adapter 103. The assembly 100 also includes an input adapter 104 for receiving coins from an upper part of the pay telephone and delivering them to the coin escrow apparatus 110. The adapters 101–104 are each removably mounted to housing 111 of the escrow apparatus 110. Thus, to provide an escrow assembly 100 to work in a certain different type of pay telephone, different style adapters are used. In this way, one coin escrow apparatus design can be made to work with pay telephones made by different manufacturers.

The assembly 100 also includes a flag and micro switch arrangement, as is conventional in the prior art. Included therein is a flag axle or flag shaft 105, a flag 106, a flag reset tab 107, a microswitch 108, and a microswitch actuator 109 attached to the flag shaft 105. A flag such as this typically is used in existing phone configurations and it is provided in the illustrative embodiment to show how the escrow unit can be used to replace existing escrow units in existing telephone applications.

With the flag in its normal upright position, it holds the microswitch open. When the central office samples the output from the microswitch, and sees that it is open, this is an indication that no coin is present in the hopper. When a coin is dropped into the hopper, the flag is set by a trigger pivot arm (unshown) or by the incoming coin to indicate the presence of a coin. The escrow unit itself does not know what coinage is present, only that at least one coin is in the escrow unit hopper. The operation of the flag and the microswitch then informs the central office that a refund will be required if the call is not completed.

Such a flag arrangement may not be necessary when using electronic coin discriminators or with so-called "smart" telephone arrangements. Rather, a contact simulation can be provided as shown in FIG. 2. Moreover, this integrated circuit can be provided on printed circuit board 170, as shown schematically in FIG. 7.

Figure 9:
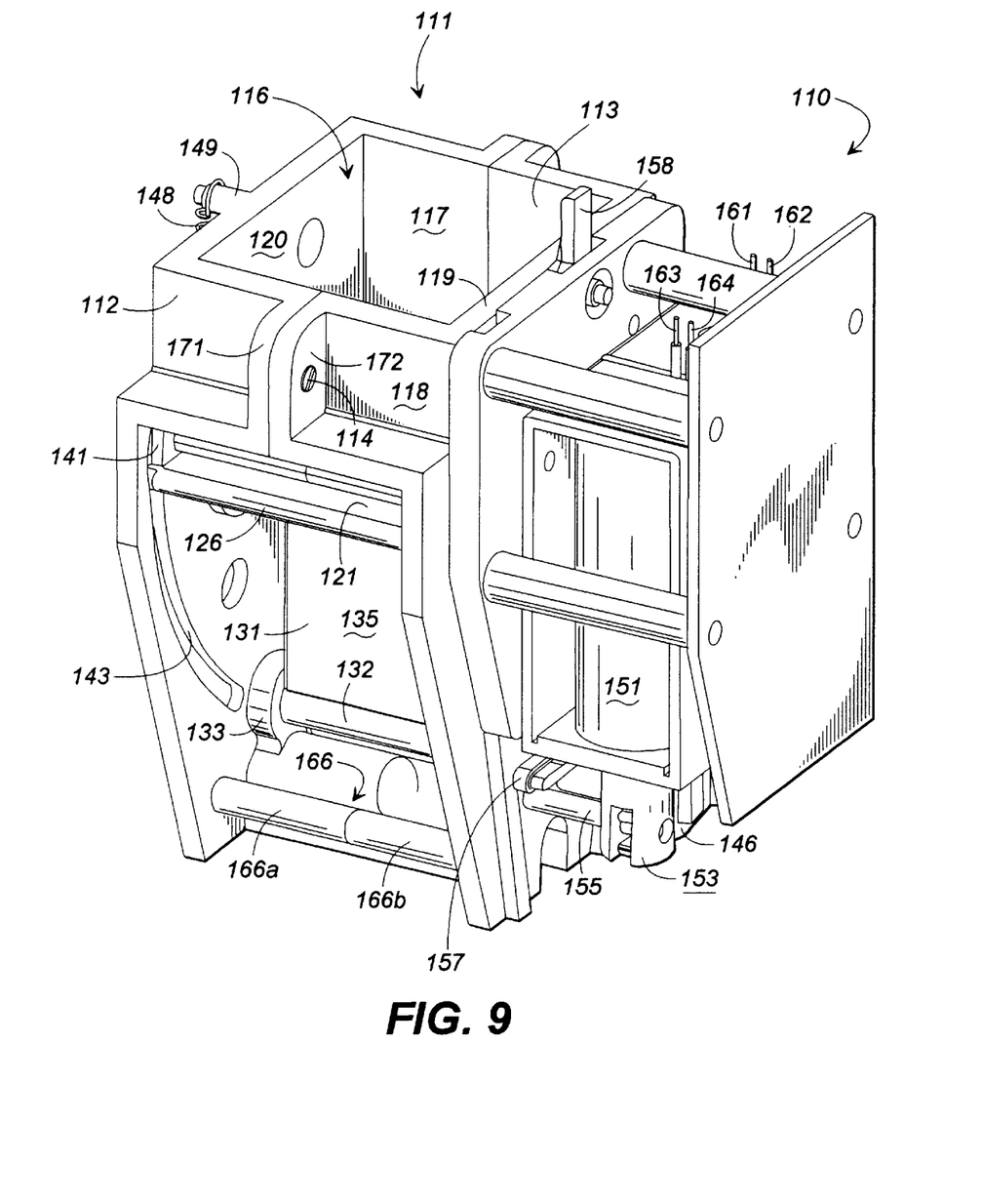
FIG. 9 is a front, left perspective view of the coin escrow apparatus of FIG. 7, shown with the coin acceptance and coin rejection adapters removed for clarity.
Figure 10:
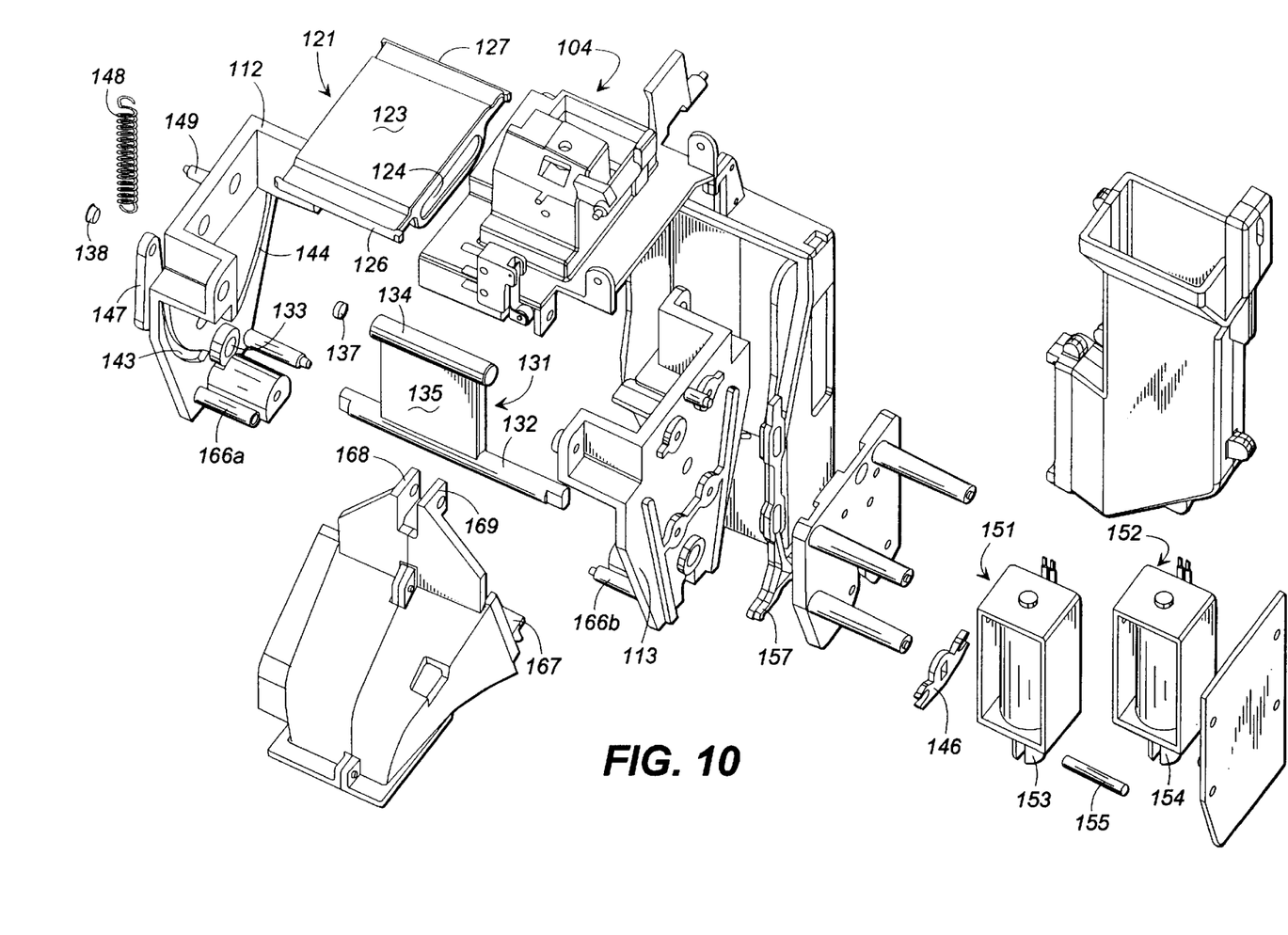
FIG. 10 is an exploded view of the coin escrow apparatus of FIG. 7.

FIG. 9 and FIG. 10 show the coin escrow apparatus 110 in greater detail. As shown, the coin escrow apparatus 110 includes a housing 111 which is made up of housing half portions 112 and 113. The half portions 112 and 113 are bolted together using fasteners, such as threaded screw 114.

The housing 111 defines a large volume coin hopper indicated generally at 116, which is defined by lower door 121, lateral sidewalls 117, 118, and front and back sidewalls 119 and 120. The coin hopper 116 has inside transverse dimensions of 44 mm. from lateral sidewall 117 to lateral sidewall 118, 38 mm. from front sidewall 119 to rear sidewall 120, and is more than 24 mm. deep. With this construction, the coin escrow mechanism is well-suited for known coins up to at least about 35 mm. in diameter. Furthermore, this allows the coin hopper to hold a large volume of coins, such as for long distance or international calls. Moreover, despite the presence of larger, heavier coins, and the presence of more of them, the coin escrow mechanism reliably resists self-actuation for reasons that will be described more fully below.

The lower door 121 includes a central flat upper surface 123 and front and rear cam tracks such as cam track 124. The lower door 121 also includes elongate guide pins 126 and 127 at the outer ends thereof.

A pivotal support member 131 is pivotally mounted to the housing 111 about a pivot axle 132 which rides in a pivot bore 133. In addition to the pivot axle 132, the pivotal support member 131 includes a cam portion 134 and a web portion 135 extending between the cam portion 134 and the pivot axle 132.

A magnet 137 is permanently placed in an end of the cam portion 134 and a corresponding magnetically responsive metal element (e.g., steel) 138 is permanently placed in the housing half portion 112. The purpose of the magnet 137 and element 138 is to help return and maintain the pivotal support member 131 in a vertical orientation, centered halfway between the ends of the lower door 121. This magnetic centering means also provides some dynamic damping.

Figure 11:
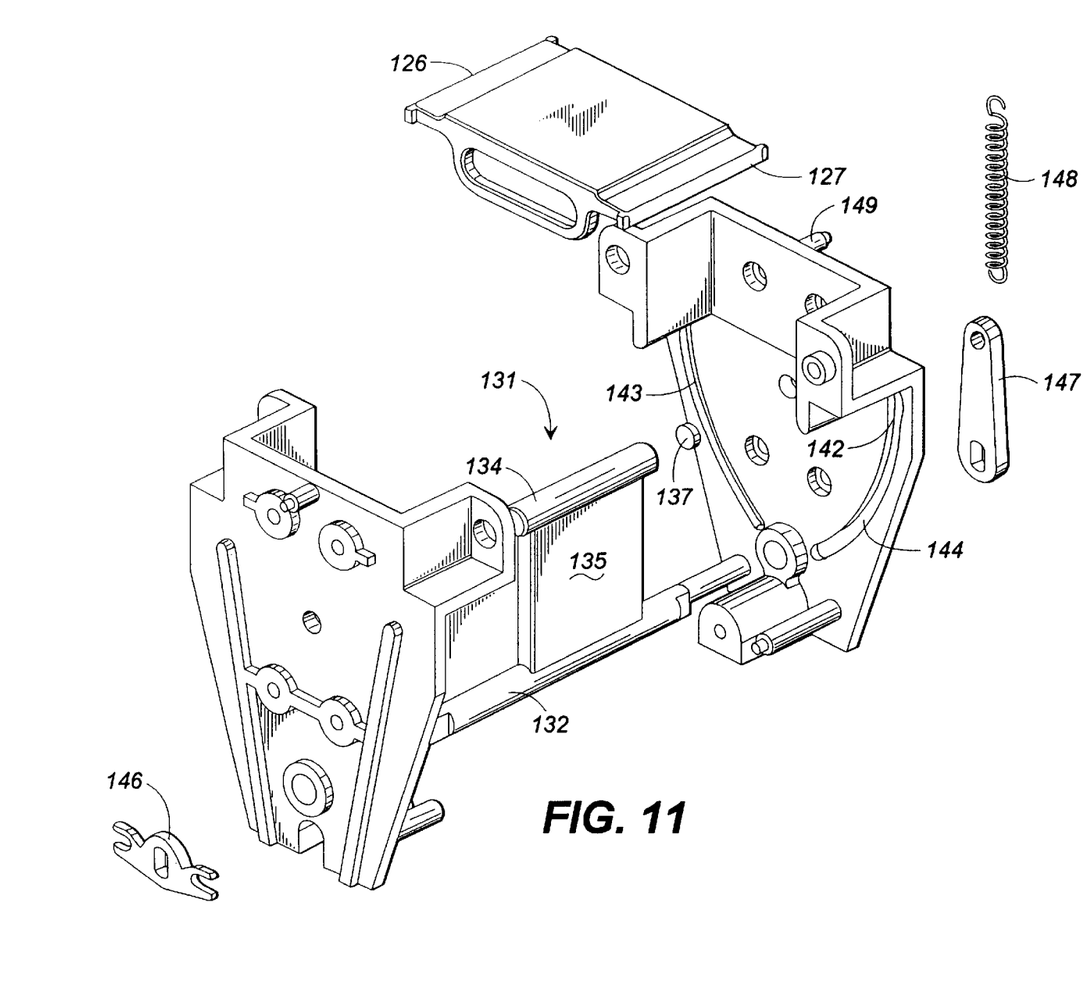
FIG. 11 is an exploded view of a portion of the coin escrow apparatus of FIG. 7.
Figure 12:
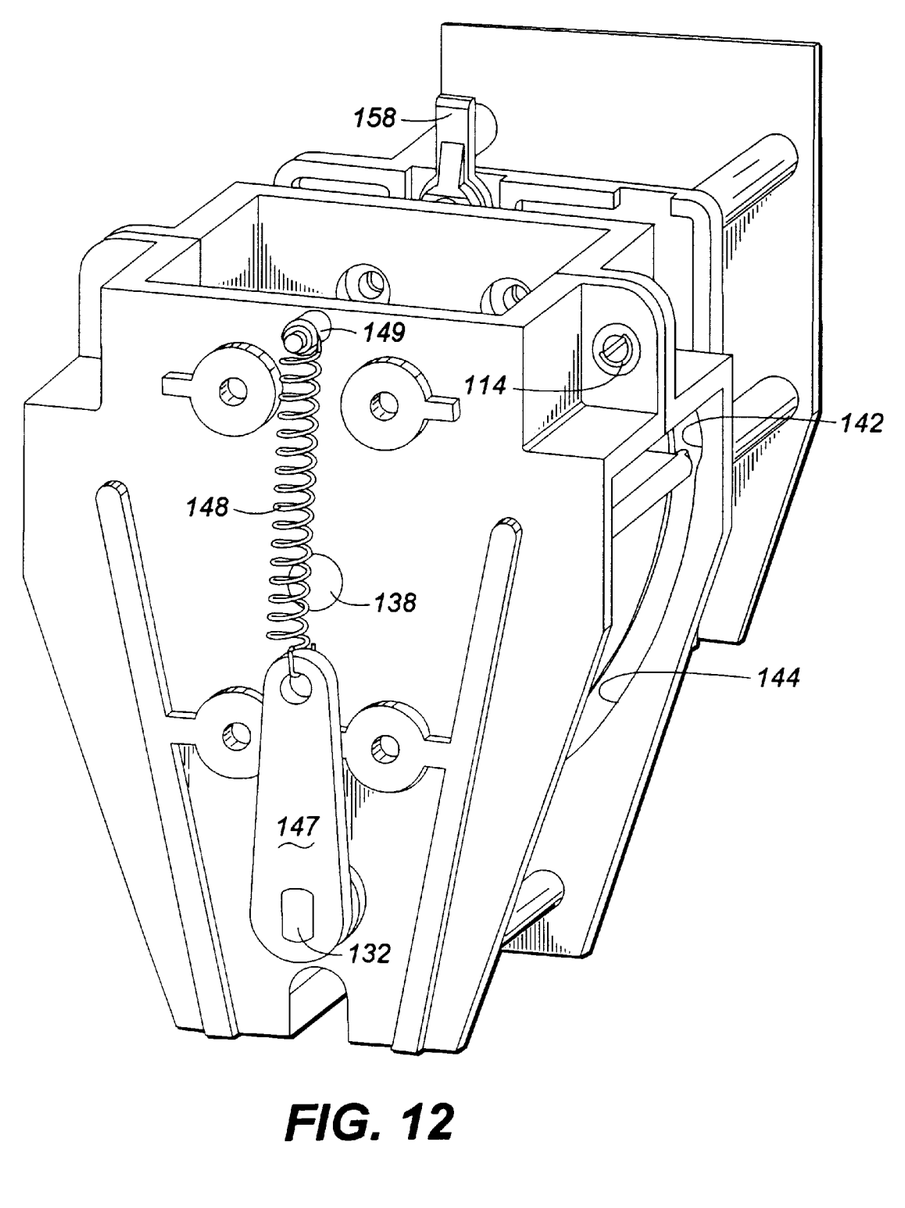
FIG. 12 is a perspective, right, rear view of the coin escrow apparatus of FIG. 7.

The elongate guide pins 126 and 127 ride in pivot tracks 141 and 142 and guide tracks 143 and 144. (See also FIGS. 11–13.) As best seen in FIG. 9 and in FIG. 14A, the very end portions of the guide pins which are received in the pivot tracks and guide tracks are oval-shaped, rather than round, to provide a greater contact surface for contacting the tracks.

Figure 14A:
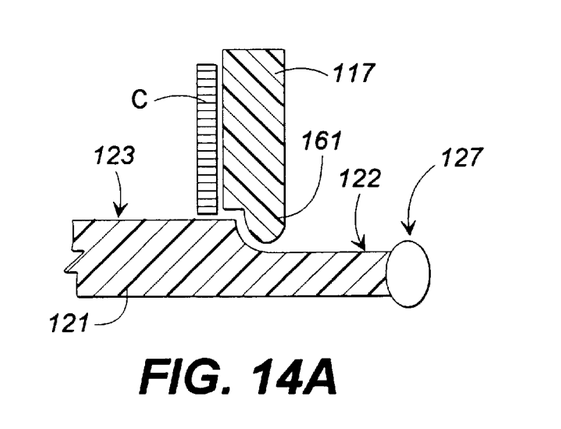
FIG. 14A is a sectional view of a portion of the coin escrow apparatus of FIG. 7.

Also, the minor axis of the oval-shaped guide pins is substantially less than the width of the pivot tracks and guide tracks so that the guide pins are loosely guided therein.

Referring now to FIGS. 9–12, it can be seen that the pivot axle 132 includes drive flats formed on the ends of the pivot axle for receiving a rocker arm 146 on one end and a return arm 147 on the opposite end. The return arm 147 is used in conjunction with a return spring 148 and a return spring mounting post 149 to help urge the return arm 147 into a vertical, upright orientation. In this way, the return spring 148 helps to return the lower door 121 to its escrow position. Also, once the return arm 147 manages to urge the lower door 121 to anywhere near its horizontal escrow position, the magnetic centering means 137, 138 help to stabilize the door in the escrow position and to keep it completely closed. In this way, the apparatus quickly and easily returns to an equilibrium state in which the lower door 121 is in its horizontal, escrow position and the pivotal support member 131 is in its upright position for supporting the lower door.

As best seen in FIGS. 9 and 10, the rocker arm 146 couples the pivot axle 132 of the pivotal support member 131 to first and second solenoids 151 and 152. For example, the rocker arm 146 is coupled to the plunger 153 of the solenoid 151 using a clevis pin 155. The plunger 154 of solenoid 152 is similarly coupled to the rocker arm 146 by an unshown clevis pin. Moreover, the clevis pins are longer than merely necessary to couple the plungers to the rocker arm and extend rearwardly from the plungers in order to trip a flag reset arm 157 in order to extend a flag reset element 158. The solenoids 151 and 152 are powered using electrical leads, such as electrical leads 161–164, by connection to a suitable electrical control system. Each of the solenoids is a pull solenoid.

Still referring to FIGS. 9 and 10, the housing 111 includes adapter mounting bars, such as adapter mounting bar 166. The adapter mounting bar 166 is made up of two halves, 166a and 166b. Mounting bar half 166a is integrally molded with half portion 112 of the housing, while mounting bar half 166b is integrally molded with the other housing half portion 113. Adapter mounting bar 166a includes a female portion in the end thereof, while adapter mounting bar half portion 166b includes a male portion in the end thereof for mating engagement therewith when the housing is put together. In this way, some added rigidity is afforded to the adapter mounting bar 166. While FIG. 9 shows an adapter mounting bar 166 on the one side of the housing, another adapter mounting bar (unshown) is positioned on the opposite side of the housing.

The adapters are mounted to the housing using these adapter mounting bars. For example, adapter 101 includes a curved foot portion 167 which is adapted to hook over the adapter mounting bar 166. The adapter 101 also includes a pair of upper spaced apart mounting flanges 168 and 169 each having a mounting hole extending therethrough. With the foot 167 slipped over the mounting bar 166, the adapter is swung upwardly until the flanges 168 and 169 straddle corresponding flanges 171 and 172 of the housing 111. The adapter 101 is then secured in place using a threaded fastener, such as threaded fastener 114 (obviously, if this fastener already is in place before the adapter 101 is to be mounted, the threaded fastener 114 should be removed). In this way, the adapters are removably mounted to the housing 111. Likewise, the input adapter is slipped down over the hopper 116 and it includes flanges for straddling the same flanges 172 and 171 of the housing and is secured in place along with the side-mounted adapters.

Figure 13:
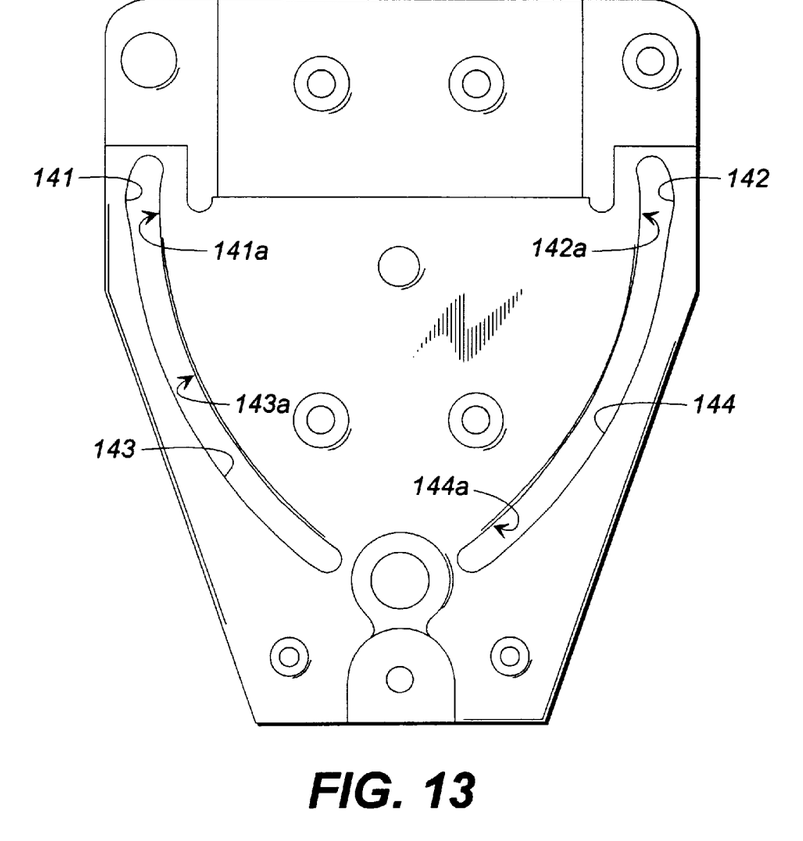
FIG. 13 is a sectional view of a portion of the coin escrow apparatus of FIG. 7.

FIG. 13 shows the arrangement of the pivot tracks and the guide tracks, which is fairly similar to what is shown in the earlier figures in connection with the first embodiment. For example, the pivot tracks 141, 142 are more sharply curved than the guide tracks 143, 144. Note however that the inner surfaces 141a, 142a have been contoured to make a smooth transition to the guide tracks inner surfaces 143a, 144a.

Figure 14B:
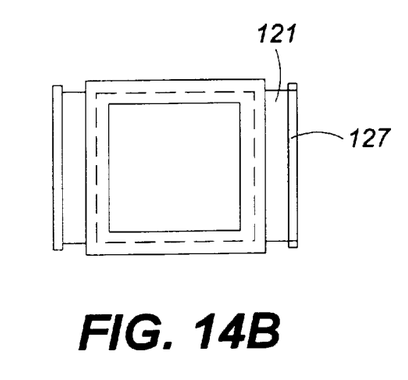
FIG. 14B is a plan view of a portion of the coin escrow apparatus of FIG. 7.

FIGS. 14A and 14B show how the sidewalls of the housing in the region of the coin hopper overhang and partly shroud edge portions of the door 121. In this way, coins, such as coin C of FIG. 14A, are prevented from slipping into the space between the sidewalls and the shoulder at the transition between the raised upper surface 123 of the door and the lower outer surfaces, such as surface 122. A lower portion 161 of the lateral sidewalls, such as sidewall 117, is rounded and acts as a fulcrum about which the door 121 pivots. Lateral sidewall 118 has a similar fulcrum. In this regard, the rounded shoulder or transition between the upper surface 123 and the lower surface 122 engages and cooperates with the rounded fulcrum to facilitate the pivotal motion of the door. This also tends to help center the door between the fulcrums.

As previously mentioned, one advantage of the present invention is that it can be used with a "smart" pay telephone without needing a costly and complex flag and switch arrangement. Also, very little force is required to activate or trigger the door using the pivotal support member, while at the same time the apparatus resists self-actuation from the weight of coins resting on the door. Indeed, it takes only a very small motion of the pivotal support member 131 to trigger the door to open one way or the other. In this regard it is very helpful that the door does not have to lift the coins in order to move one way or another. Movements as small as one-eighth of an inch of the cam portion 134 from the centered position trigger the door and allow the weight of the coins above the door to help force the door open and to allow the coins to pass therethrough. This allows the apparatus to be operated at very low power levels, which is advantageous since there may not be much power available over the telephone line to power this device. Thus, pivotal support member 132 is operable for supporting the lower door in its escrow position substantially only when the pivotal support member is vertical (and therefore centered between the ends of the lower door).

While the invention has been shown in preferred forms, it will be apparent to those skilled in the art that many modifications, additions, and deletions can be made therein without departing from the spirit and scope of the invention as set forth in the following claims.

What is claimed is:

1. A coin escrow apparatus for use with a pay telephone comprising:

a housing defining a coin hopper, a coin acceptance chute, and a coin return chute;

a door mounted within said housing for selective movement between an escrow position for supporting coins in said hopper, an acceptance position for releasing coins from said hopper to said coin acceptance chute, and a return position for releasing coins from said hopper to said coin return chute;

actuator means for selectively moving said door between said escrow, said acceptance, and said return positions; and electronic means responsive to a control signal for delivering electrical power to said actuator means for controlling selectively movement of said door, said electronic means producing an actuator firing confirmation signal responsive to the control signal, regardless of whether said actuator means actually fires successfully or not.

2. A coin escrow apparatus as claimed in claim 1 wherein said electronic means comprises an integrated circuit.

3. A coin escrow apparatus as claimed in claim 2 wherein a first part of said integrated circuit is opto-isolated from a second part of said integrated circuit.

4. A coin escrow apparatus as claimed in claim 1 wherein said electronic means is adapted to delay slightly the generation of said actuator firing confirmation signal and to maintain the actuator firing confirmation signal a selected length of time to mimic a generated signal of a mechanical relay.

5. A coin escrow apparatus as claimed in claim 4 wherein said electronic means comprises a capacitor to extend the duration of the actuator firing confirmation signal.

6. A coin escrow apparatus as claimed in claim 1 wherein said actuator means further comprises:
   (a) guide means for guiding said door for pivotal movement in a first direction and in a second direction opposite said first direction;
   (b) pivotal support means positioned below said door and having an upper portion engaging said underside of said door intermediate said first and second ends of said door, said pivotal support means pivoting about a pivot axis below said door; and
   (c) solenoid means for pivoting said pivotal support means.

7. A coin escrow apparatus as claimed in claim 6 wherein said pivotal support means is perpendicular to said door with said door in said escrow position.

8. A coin escrow apparatus as claimed in claim 6 wherein said housing defines first and second fixed pivot points above said door, about which fixed pivot points said door pivots.

9. A coin escrow apparatus as claimed in claim 6 wherein said guide means comprises curved pivot tracks and curved guide tracks, said pivot tracks being shorter and more sharply curved than said guide tracks.

10. A coin escrow apparatus as claimed in claim 6 further comprising centering means for centering said pivotal support means beneath said door in said escrow position.

11. A coin escrow apparatus as claimed in claim 10 wherein said centering means comprises first means positioned in said housing and second means positioned in said pivotal support means, with at least one of said first and second means comprising a magnet.

* * * * *